Oct. 14, 1941.   W. VAN B. ROBERTS   2,259,392
PHASE MODULATION
Filed March 18, 1939

INVENTOR
WALTER VAN B. ROBERTS
BY
ATTORNEY

Patented Oct. 14, 1941

2,259,392

UNITED STATES PATENT OFFICE 2,259,392

PHASE MODULATION

Walter van B. Roberts, Princeton, N. J., assignor to Radio Corporation of America, a corporation of Delaware Application March 18, 1939, Serial No. 262,631

5 Claims. (Cl. 179—171.5)

Figure 3:
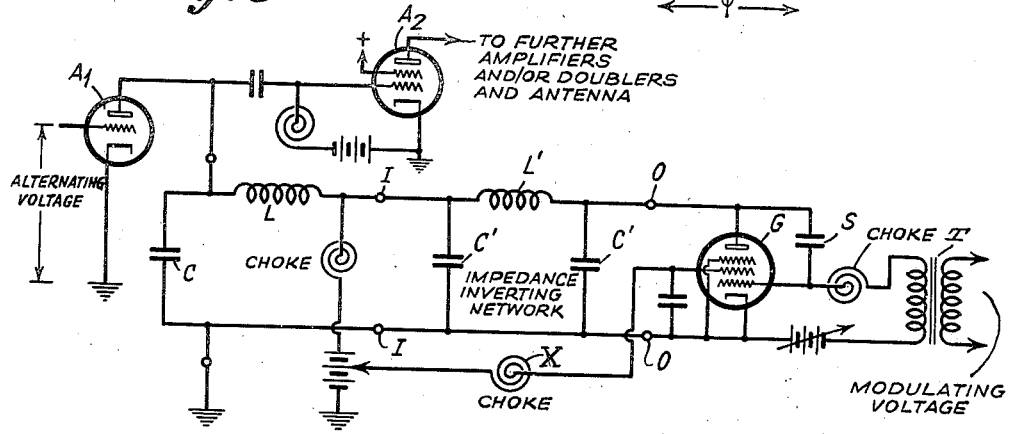

In United States Patent #2,050,067 there is shown in Figure 3, a phase modulating arrangement which is capable of producing phase modulation without amplitude modulation.

The object of the present invention is to provide improved means for providing the variable resistance which determines the phase in the arrangement above mentioned. In the accompanying drawing, Figure 1 illustrates the basic form of the circuit, Figure 2 shows the required variation of the resistance of the basic circuit for linear phase modulation, and Figure 3 shows the phase modulating portion of a transmitter arranged in accordance with the present invention.

Figure 1:
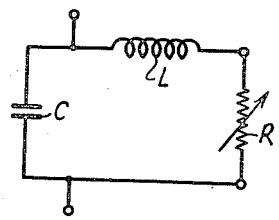

Referring to Figure 1, the behavior of the basic circuit as shown may be summarized as saying that if the reactance of condenser C is made twice as great as the reactance of the inductance L at the operating frequency, then the impedance measured between the circuit terminals has a magnitude equal to the reactance of the condenser regardless of the value of the resistance R. As the resistance is varied from zero to infinity, the impedance of the circuit changes from a purely inductive reactance to a purely capacitive reactance, passing through a condition of pure resistive impedance when the resistance is equal to the reactance of the coil. Hence, if a constant current of the operating frequency is caused to traverse this circuit, the voltage developed between its terminals swings in phase from a voltage which leads the current by 90° when the resistance is zero, to a voltage lagging the current by 90° when the resistance is infinite. When the resistance is equal to the coil reactance, the voltage developed is in phase with the current. If the normal value of resistance is chosen to bring the voltage in phase with the current, it is then seen that the phase of the voltage may be swung back and forth by varying the resistance above and below this normal value.

Since in practice the circuit of Figure 1 will be supplied with current from the plate circuit of a screen grid amplifier and the voltage developed will be applied to the grid circuit of a succeeding amplifier tube, the output and input capacities of these two tubes, falling in parallel with condenser C, set a lower limit to the amount of capacity that must be employed in the circuit. At very high frequencies this means that the reactance condenser C cannot be made more than a certain upper limit and, hence it follows that the normal value of the resistance cannot exceed a definite value which may be, for example, of the order of a few hundred ohms. If, therefore, it is desired to employ a vacuum tube as the variable resistance element R, the low value of normal resistance desired may prove to be difficult to obtain without utilizing a very large tube or several tubes in parallel. Furthermore, any tube employed to take the place of resistance R will have inter-electrode capacities which add a new and unwanted element to the circuit. These capacities could, of course, be substantially neutralized by shunting them with suitable inductance coils, but this expedient alone is not sufficient to attain other objects of the invention.

Figure 2:
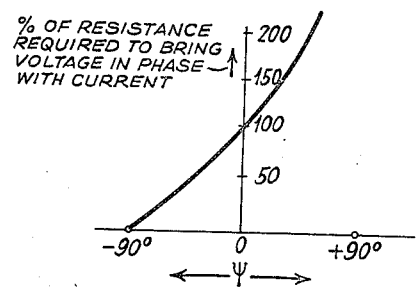

Referring now to Figure 2, the curve shows the relation between the resistance R and the angle of lead or lag of the voltage across the circuit of Figure 1 with respect to the current and, thus, it is seen that in order to obtain a phase deviation linearly proportional to a modulating voltage, the resistance R must vary with the modulating voltage according to a curve of the same shape as the one shown in Figure 2. The equation of this curve is R=100 tan (450°+ψ/2) where R is expressed as the percentage of the value which produces a voltage in phase with the current. In accordance with the invention, a resistance variation very similar to that shown in Figure 2 is obtained and thereby linear modulation is assured over a considerable phase swing.

The elimination of tube capacity effects, the relatively low value of resistance, and the linear modulation discussed above are all obtained in accordance with the invention by interposing an impedance inverting network between the tube employed as a variable resistance and the points in a circuit of Figure 1 between which the variable resistance is required. This arrangement is shown in Figure 3 wherein the circuit C'L'C', having input terminals I—I and output terminals O—O, is the impedance inverting network and tube G is the tube supplying the modulating resistance. The properties of such impedance inverting networks are well known and for the present purposes it will suffice to say that the reactance of each of the condensers C' is chosen equal to the reactance of coil L' while the ratio L'/C' is made equal to the geometric mean between the tube resistance and the effective resistance required between terminals I—I. Tube G is preferably a screen grid tube whose plate is connected to its control grid through a low reactance condenser S whereby the effective conductance between its plate and cathode is equal to its transconductance. When voltage is applied solely between the plate and cathode of a screen grid tube the tube impedance is very high and practically no current flows except through the inherent capacity in shunt to the tube. If, however, the same voltage is also impressed on the control grid through a low reactance condenser (S) then plate current flows in phase with said voltage and of a magnitude equal to said voltage multiplied by the transconductance of the tube. Hence, the effective conductance of the arrangement is simply the transconductance of the tube. See Fig. 5 of my United States Patent #2,143,386 issued January 10, 1939. A radio frequency choke X prevents radio frequency potential impressed upon the control grid from being shorted to ground through the modulation transformer T. Since the effective resistance presented between terminals I—I is inverse to the tube resistance, it is proportional to the tube conductance. Therefore, the variation of effective resistance required, as illustrated in Figure 2, necessitates a transconductance variation with modulating potential of the same nature, and approximately such variations of transconductance are obtainable in ordinary vacuum tubes. Furthermore, the capacities across the input and output terminals of the impedance inverting network may be arranged to include tube capacities and other unwanted inherent circuit capacities so that by the use of the impedance inverting network the unwanted capacities are eliminated, the magnitude of the resistance required for the phase modulator is obtained, and substantially linear modulation is assured.

The design procedure is as follows:

Capacity C is preferably chosen as small as possible (in view of the tube capacities) in order to maintain a high impedance in the modulating circuit. Inductance L is thereby determined. Tube G is chosen to be a tube whose transconductance varies as a function of grid bias voltage in accordance with a curve as nearly similar as possible to that of Figure 2, and the normal bias on the tube is chosen to put the operating point on the part of this curve similar in its position on the curve to the position of the normal resistance on the curve of Figure 2. The characteristic impedance of the inverter section is then chosen to convert the normal tube conductance to the value required in the modulator circuit, namely, a value equal to the reactance of coil L. The voltage developed across the modulator circuit is impressed upon a subsequent amplifier A2 and preferably, this amplifier is arranged to operate without drawing grid current so that there will be substantially no conductance in shunt to the impedance of the modulator network. However, if the impedance of the modulator network is low compared to the input impedance of the amplifier A2, this precaution is not essential.

Having thus described my invention, what I claim is:

1. In a phase modulator, a circuit including a capacity in parallel with the series combination of an inductance and an effective resistance, the reactance of said capacity being approximately twice the reactance of said inductance, the normal value of said resistance being of the same order of magnitude as the reactance of said inductance, said resistance comprising an impedance inverting network terminated by an electronic discharge device, means for causing substantially constant radio-frequency current to flow through said network, means for varying the radio frequency resistance of said discharge device in accordance with signalling voltage, and means for utilizing the voltage developed across said circuit.

2. In a phase modulator, a connection comprising a capacity and an inductance the reactance of which is substantially one-half of the reactance of the capacity, means for causing alternating current to be modulated to flow in said connection, an impedance variable at signal frequency, an impedance inverting network connecting said variable impedance to said capacity and inductance to form therewith a circuit closed by a substantially pure resistance, and means for varying said variable impedance at signal frequency, whereby the voltage produced by the flow of said current in said connection varies in phase in accordance with said impedance variations said voltage being of constant amplitude.

3. In combination with an electron discharge device having an anode, a cathode and a control grid, means connecting the anode to the grid through a condenser of low impedance to alternating current of radio frequency whereby the alternating current radio frequency resistance between the anode and cathode is controlled in accordance with the mutual conductance of said device, means for controlling the mutual conductance of said device in accordance with modulating voltages, said device exhibiting undesired shunt capacity across said resistance, and means for converting said resistance into a pure resistance varying inversely with said mutual conductance comprising an impedance inverting network connected between said capacity-shunted resistance and a pair of terminals between which said pure resistance is obtained, said network comprising a pair of shunt capacities and a series inductance therebetween, the reactance of said inductance being equal to the total capacity reactance connected at each side thereof.

4. In signalling apparatus an electron discharge tube of the screen grid type having input electrodes including a grid and cathode and output electrodes including an anode and said cathode, there being inherent transconductance between said input and output electrodes, means for applying signal voltage to the input electrodes of said tube to vary the instantaneous bias therebetween and thereby vary the transconductance of the tube in accordance with signal voltage, a capacity connected between said grid and anode for maintaining the grid and anode at substantially the same radio frequency potential, a pair of terminals excited by radio frequency voltages, and means for producing between said terminals an effective radio frequency resistance the value of which varies proportionally to variations in said tube transconductance including an impedance inverting network formed by an inductance shunted at each end by a condenser, a connection between the plates of one of said condensers and said pair of terminals, and a connection between the plates of the other of said condensers and said output electrodes.

5. In signalling apparatus, a pair of terminals and means for producing between said terminals an effective radio-frequency resistance the value of which varies in direct proportion to variations in the transconductance of a tube comprising, means for exciting said terminals by radio-frequency voltages, an electron discharge tube of the screen grid type having input electrodes including a grid and cathode and output electrodes including an anode and said cathode, there being transconductance between said input and output electrodes, said transconductance being dependent on bias between said input electrodes, means for applying signalling voltages to the input electrodes of said tube to vary the instantaneous bias therebetween and thereby vary the transconductance of the tube in accordance with signalling voltages, an impedance inverting network formed by an inductance shunted at each end by a condenser, means connecting said terminals in shunt to one of said condensers, means connecting the other of said condensers between the output electrodes of said tube, and coupling means between said anode and grid for impressing on said grid a radio frequency potential cophasal with and proportional to the radio frequency potential of said anode whereby the effective conductance between said output electrodes is proportional to said transconductance.

WALTER van B. ROBERTS.